United States Patent
Pepe et al.

(10) Patent No.: US 6,744,010 B1
(45) Date of Patent: Jun. 1, 2004

(54) LASER DRILLED HOLES FOR FILM COOLING

(75) Inventors: David M. Pepe, Branford, CT (US); Alan J. Ittleson, North Haven, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 07/948,076

(22) Filed: Sep. 21, 1992

Related U.S. Application Data

(63) Continuation of application No. 07/749,005, filed on Aug. 22, 1991, now abandoned.

(51) Int. Cl.[7] .............................................. B23K 26/00
(52) U.S. Cl. ............................. 219/121.71; 219/121.66
(58) Field of Search ..................... 219/121.66, 121.7, 219/121.71, 121.85, 121.76, 121.77, 121.68, 121.78

(56) References Cited

U.S. PATENT DOCUMENTS

| | | | | |
|---|---|---|---|---|
| 4,081,655 A | * | 3/1978 | Gale | ...................... 215/121.85 |
| 4,181,051 A | * | 1/1980 | Drori | ................. 219/121.85 X |
| 4,709,754 A | * | 12/1987 | Chu et al. | .................... 165/133 |
| 4,818,834 A | * | 4/1989 | Rupert | ..................... 219/69.17 |
| 5,093,548 A | * | 3/1992 | Schmidt-Hebbel | ...... 216/121.75 |

FOREIGN PATENT DOCUMENTS

| | | | | |
|---|---|---|---|---|
| CH | 0572798 | * | 2/1976 | ............ 219/121.71 |
| JP | 0033091 | * | 2/1984 | ............ 219/121.71 |
| JP | 0006913 | * | 2/1987 | ............ 219/121.71 |
| WO | 8602301 | * | 4/1986 | |

* cited by examiner

Primary Examiner—Mark H. Paschall
(74) Attorney, Agent, or Firm—Sughrue Mion, PLLC

(57) ABSTRACT

A hole geometry and laser drilling technique for forming a shaped diffusing film coolant passage having a straight constant cross section metering portion which connects with a conical section which exits on the surface to be cooled. The metering portion of the hole provides for air quantity metering while the tapered portion provides a diffusion effect on the cooling air so that upon exit the cooling air remains attached to the surface to be cooled and thereby provide effective film cooling.

5 Claims, 2 Drawing Sheets

LASER DRILLED HOLES FOR FILM COOLING

This is a continuation of Application No. 07/749,005 filed Aug. 22, 1991 now abandoned.

TECHNICAL FIELD

This invention relates to the field of shaped holes, to the field of laser drilled holes, and particularly relates to the field of laser drilled shaped holes for film cooling of gas turbine hardware.

BACKGROUND OF THE INVENTION

The efficiency of gas turbine engines can be increased by increasing operating temperatures. Current practice is to operate gas turbines at gas temperatures which can exceed the melting point of the materials used in the combustion and turbine. Melting is avoided by providing air cooling.

In a common cooling scheme known as film cooling, pressurized air is flowed into passages within the component and exits through a plurality of finely drilled holes which communicate between the passage and the surface to be cooled. The most effective cooling is obtained when the cooling air exiting the holes flows smoothly, as a film, over the surface to be cooled. In so doing the cooling air insulates the surface from the hot gas stream. The effectiveness of this type of cooling requires that the air film remain immediately adjacent to the surface to be cooled. In terms of art, the cooling air flow remains "attached" to and does not "separate" from the surface. Effective cooling also requires that the film cover as much of the surface as possible.

The air used to cool the parts reduces engine efficiency and there is a need to minimize the amount of cooling air and maximize its effectiveness. Various hole geometries have been proposed to accomplish these ends. Typically the holes are drilled at an acute angle to the surface to be cooled so that the air exiting the cooling hole has a natural tendency to flow over the surface in the direction of the external air flow. Some proposed cooling schemes have involved shaped holes, e.g., straight sided, elliptical holes, which provide a fan of cooling air rather than a cylindrical column of cooling air.

It has also been proposed to use holes which vary in cross section as they pass through the thickness of the part being cooled. Thus, for example in U.S. Pat. No. 3,527,543 it is proposed to use small conical holes which are divergently tapered over their entire length toward the outer surface. This allows the cooling air to expand in a controlled fashion so that its velocity is reduced and its area increased, thus rendering it more likely to remain attached to the surface being cooled and providing greater surface coverage.

Two general techniques are used for cooling hole production. Electro-discharge machining (EDM) uses an electric arc to erode the workpiece as the current flows through a shaped electrode. As the shaped electrode is advanced into the workpiece, arc discharge occurs and a hole is produced which closely mimics the external shape of the electrode. Such holes are slow and expensive to produce.

U.S. Pat. Nos. 4,197,443 and 4,705,455 deal with the production of shaped cooling holes having a tapered portion and a constant cross section portion using an electro-discharge machining technique. Electrodes are used which produce holes which have an essentially rectangular exit geometry.

The other common hole drilling technique is laser drilling. In this technique a pulsed laser with a focused beam produces a hole by melting the substrate. Laser drilling is substantially cheaper and faster than EDM machining. Techniques have been proposed to produce shaped holes with laser drilling, see for example U.S. Pat. No. 4,992,025, but none have met with commercial success because they increase the time and cost of laser drilling and the complexity of the laser drilling apparatus.

U.S. Pat. Nos. 4,762,464 and 4,808,785 propose the combination of EDM and laser drilling to produce cooling holes.

SUMMARY OF THE INVENTION

According to the present invention, shaped cooling holes are produced by a multi-step laser drilling process.

The hole has a straight sided metering portion, with an essentially constant cross section, which originates at the inner surface of the component to be cooled and transitions to a cone shaped portion whose large end is located on the surface to be cooled. The straight sided portion provides metering of the air. The conical portion permits expansion and slowing of the cooling air, known as diffusion, so that upon exit from the conical section the air flow tends to become and remain attached to the surface rather than separate from the surface as might be the case if a straight sided metering hole extended to the outer surface.

The laser drilling is accomplished with a pulsed laser. In a preferred method the laser beam has a relatively large spot size and high total energy when the conical portion is formed. When the conical section has been drilled, the workpiece is moved relative to the beam so that the beam size is smaller. The energy of the beam is also reduced and the metering portion of the hole is drilled.

BEST MODE FOR CARRYING OUT THE INVENTION

The present invention provides a shaped hole having a first conical portion and a second straight portion using a laser drilling technique.

Figure 1:
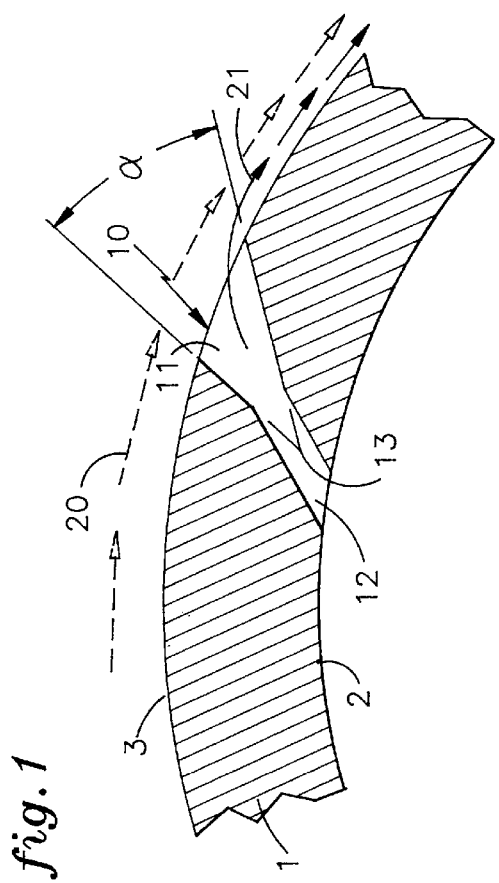
FIG. 1 shows the ideal geometry of a cooling, hole according to the present invention and the laser workpiece geometry used to produce such a hole.

FIG. 1 is a drawing of a substrate with a hole according to the present invention. The FIG. 1 hole is shown with straight sides and sharp angles to demonstrate the idealized geometry. The remaining figures show the irregular surfaces and rounded angles typical of actual laser drilled holes. Referring now to FIG. 1, substrate 1 has inner surface 2 and outer surface 3. During turbine operation a source of cool air (not shown) provides pressurized cooling air to the inner surface. Cooling hole 10 connects inner surface 2 and outer surface 3 and allows cooling air to flow to the outer surface. Cooling hole 10 is comprised of a conical portion 11 which connects with outer surface 3 and a straight sided metering portion 12 which connects with the narrow end of the conical portion, the cone apex 13, and with inner surface 2. Hole 10 is shown inclined with respect to inner surface 2 and outer surface 3 and provides an effective flow of cooling air over outer surface 3 as generally shown. Hot fluid 20, generally the products of combustion of a hydrocarbon fuel and compressed air, flows over surface 3. Cooling air 21 emerges from the cooling hole 10 and flows as a film over outer surface 3, being interposed between outer surface 3 and hot fluid 20 and thereby protecting outer surface 3 from hot fluid 20.

The metering portion of the hole 10 has an essentially constant cross section and straight sides. In practice the average diameter will range from about 0.010 to about 0.040 in. and preferably from about 0.015 to about 0.025 in. For non-circular holes equivalent cross sections are desired. Ideally, the cross section of each metering hole does not vary over the length of the hole. In practice however, a diameter change of 0.002 or 0.003 in. over the length of the hole will result. The metering portion of the shaped hole controls the amount of cooling air flowing through the cooling hole. The conical portion 11 of the cooling hole starts from the metering hole and expands towards the surface to be cooled. The included angle a will range from about 8° to about 20°, and preferably from 10° to 16°.

Components which are cooled in gas turbine engines have wall thicknesses which may range from about 0.010 to about 0.150 in. or more. Typically, the metering portion 12 of the hole will comprise about 20–60% of the total hole depth. In its broadest limit, however, the metering portion 12 of the hole may have a depth which is equal only to about its average diameter, since a metering portion of this size will provide the necessary metering action. A conical hole without a constant cross section metering portion is unsatisfactory because the size of the hole which communicates with the cooling air (the small end of the cone) will vary with wall thickness and hole angle.

The remainder of the hole is the conical diffusion portion 11. In a typical part, the exit size of the conical portion will range from about 0.030 to about 0.100 and preferably from about 0.045 to about 0.060 inches in diameter. Again, for non-circular holes, equivalent areas are desired.

The word "conical" is used in its technical sense and includes geometries having non-circular cross sections. We used a laser which used a cylindrical laser rod to produce a circular cross section beam. Other laser rod geometries can produce laser beams with noncircular cross sections. For example a rectangular cross section rod can produce a laser beam with a substantially rectangular cross section. Such a rectangular beam can be used to produce conical holes with a roughly rectangular cross section (though with rounded corners) and such holes are within the scope of the present invention.

The most important geometrical aspect of the conical portion is the included angle α. If the angle is less than the angle specified, the cooling air diffusion in the conical section will be less than optimum and the air exiting from the cooling hole may have sufficient velocity to become separated from the surface which is to be cooled. If the angle is greater than the range specified, the cooling air may become detached from the walls of the conical portion and turbulence rather than diffusion may occur.

The method of producing the previously described holes in superalloy materials involves several steps, some of which are essential and others which are desirable. These steps will be discussed in general and then with specific reference to the particular process used by the inventors.

The machine used was a 400 watt yttrium aluminum garnet (YAG) laser machine produced by International Laser Machining Corporation which is now part of the English firm of Electrox. We operated the machine at varying power levels typically between 60 and 100 watts.

A major aspect of the invention is that the spot size of the laser beam, at the point of interaction with the workpiece, is changed at least once during the drilling process. We prefer to drill the conical section first followed by the metering portion. However, as will be discussed below, the order of steps can be reversed although at some increase in process complexity.

Assuming that the conical section is to be drilled first, the laser spot size is selected to be relatively large-(with respect to the spot size to be used in drilling the metering portion of the hole) and the average laser power is chosen to be fairly high (again with respect to the power to be used to drill the metering portion) since that will also tend to increase the spot size. The conical portion of the hole is then drilled. The "power" level of a pulsed laser beam is a function of pulse width, pulse repetition rate, and power per pulse. The laser beam power striking the workpiece can also be affected by optical means, especially by a mechanical aperture which masks a portion of the beam.

Figure 2:
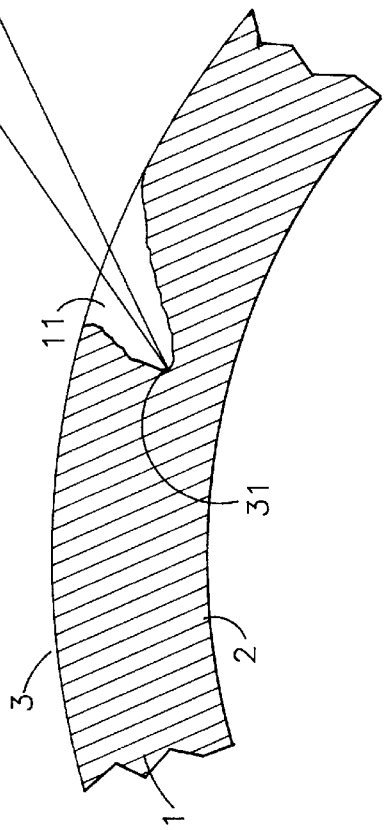
FIG. 2 shows the workpiece and laser after the conical portion of the invention hole has been drilled.

FIG. 2 shows the preferred relationship between the laser beam and the workpiece during the drilling of the conical hole portion. The workpiece 1 is preferably displaced from the laser beam focal point 31 in the direction of the laser so that the laser beam which impacts the workpiece 1 has a converging geometry. After the conical hole portion has been formed, the position of the workpiece relative to the beam is preferably changed so that the workpiece is on the opposite side of the focal point of the laser beam from the laser and is therefore in the diverging portion of the laser beam. To drill a smooth metering hole of relatively constant diameter, the laser beam diameter and angular spread is preferably reduced by placing an internal aperture between the oscillator portion and the amplifier portion of the laser. The laser beam produced by the oscillator does not have a uniform power distribution across its diameter but has a higher power density per unit area in the central portion of the beam. The portion of the laser beam removed by the aperture is the lower power density peripheral portion of the laser beam. The laser average input power is also reduced to minimize beam broadening related to laser rod heating. This combination of change in workpiece position relative to the focal point, reduction in laser beam diameter, and change in laser power all aid in drilling a smooth metering hole of constant diameter and are all preferred features of the present invention.

The particular laser machine employed in our work has a fixed focal lens arrangement, with a 250 mm focal length lens which produces a 6° laser beam. In drilling an invention hole in a substrate having a thickness of 0.100 in., when the hole is drilled at a 30° angle so that the hole length would be 0.200 in., we increased the laser spot size by moving the workpiece to be drilled 0.175 in. away from the true focal point in the direction of the laser. This defocused the beam and increased the laser spot size and caused the converging portion of the laser beam to impact the workpiece. These factors assist in developing the desired conical hole geometry. The laser machine which we employ has a series of apertures which can be selected to control the spot size, and to drill the conical hole we chose the largest aperture, one which was so large as to have essentially no effect on the beam. We operated the laser at a pulse width of 1ms and a repetition rate of 10 pulses per second. Each pulse contained about 12.5 joules of energy and we used 6 pulses to produce a conical hole portion having a depth of approximately 0.160 in. and an included angle of about 12°.

To drill the metering portion of the shaped hole, we changed the position of the workpiece relative to the laser focal point so that the workpiece was 0.100 in. from the focal point in a direction away from the laser source (the 0.175 and 0.100 dimensions are measured between the original workpiece surface and the focal point). This meant that the beam interacted with the workpiece at a point where the beam was diverging. In this instance we elected an aperture which constrained the maximum beam diameter to be about 0.213 in. (the laser beam in this machine has a nominal originating diameter of 0.375 in.). By using this central 0.213 in. diameter of the laser beam we were using the most energetic portion of the beam and this assists in drilling a straight hole. We used a shorter pulse width, 0.5 ms and a slower repetition rate (6 pulses per sec.) to minimize heating of the laser rod. We reduced the energy of the laser to about 3.6 joules per pulse further reduced the beam power striking the workpiece).

As previously noted we prefer to drill the conical section first and then to change the laser parameters and laser focal point workpiece geometry and drill the metering hole. We recognize however that it is possible to first drill the metering hole completely through the part and then to enlarge a portion of that hole and form the conical shape. That could be done relatively simply using similar parameters to those set forth above except that the number of pulses to drill the metering hole would be increased and the number of pulses required to drill the conical section would be decreased. We do not prefer this method however, because during drilling of the conical section, the metering hole would undoubtedly be obstructed by drilling debris and it would be necessary to clean the metering hole out with one or two more pulses using laser drilling parameters similar to those used to drill the metering hole.

Figure 3:
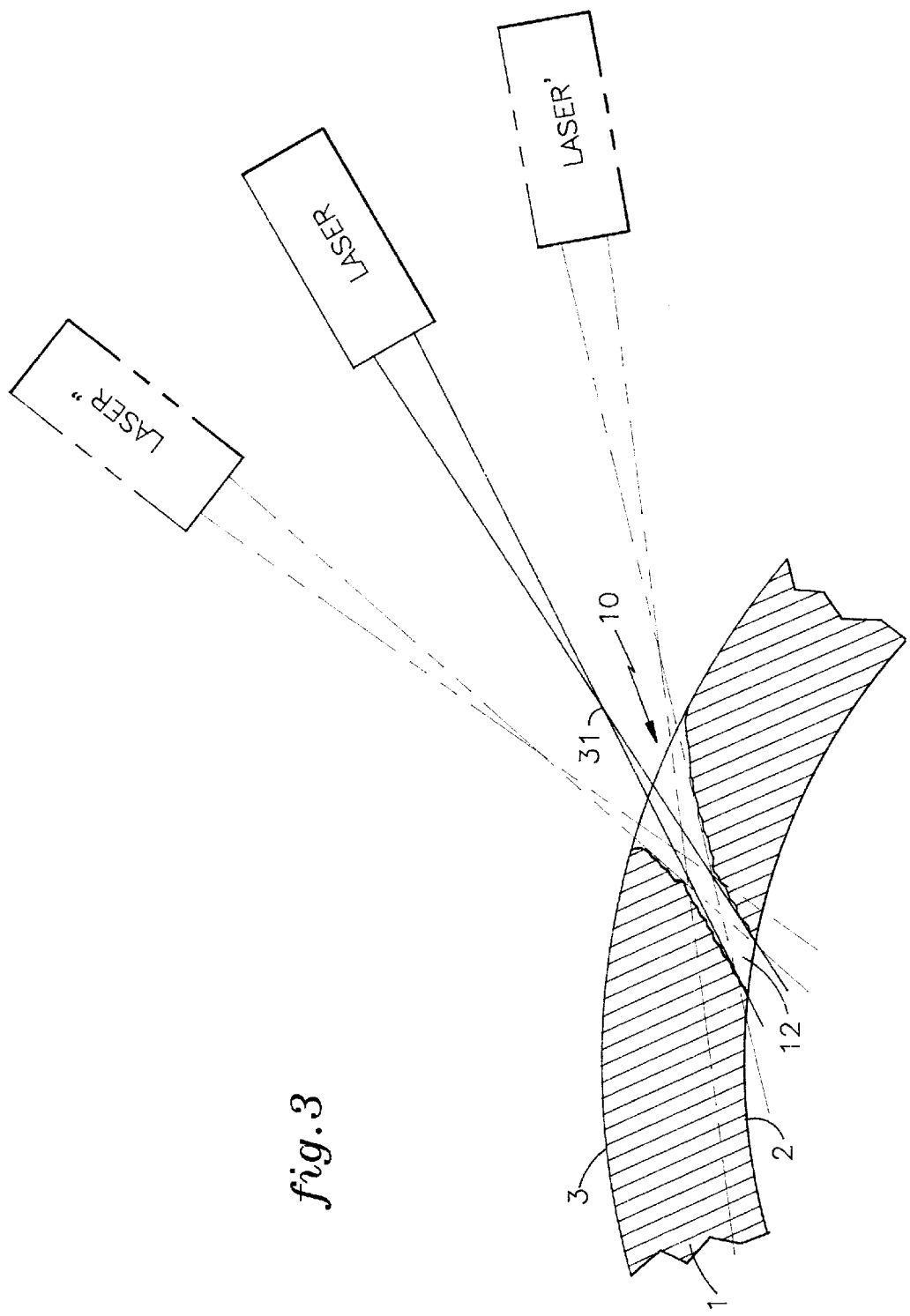
FIG. 3 shows the workpiece and laser after the conical and metering portions of the invention hole have been drilled.

The invention requires at least one change in laser focal point workpiece geometry and in laser operating parameters. It is also entirely within the scope of the invention to change geometry and/or laser operating parameters during conical hole drilling and/or metering hole drilling steps. It is our practice to maintain the laser and the workpiece in positions so that the conical and metering portions of the hole are coaxial. However, holes with a non-coaxial relationship between the conical and metering portions are within the scope of the invention. This is illustrated by FIG. 3 showing changes in laser position. The phantom laser' and laser" in FIG. 3 show how the angular position of the laser can be shifted to drill a hole with a metering portion which is not coaxial with the conical portion.

In summary, the use of the larger effective spot diameter to drill the conical section and a relatively smaller spot diameter to drill the metering section is essential to achieving the results of the present invention. operating in a convergent portion of the laser beam to drill the conical portion of the hole and the divergent portion of the laser system to drill the metering hole appears to be highly preferred. Using a higher total beam power to drill the conical portion than that used to drill the metering portion is also necessary.

We moved the workpiece relative to the laser but obviously the laser could have been moved to obtain he same result. Alternatively, a variable focal length lens system could be used to vary the focal length to achieve the same result. Using an aperture to reduce the laser beam to drill the smaller metering portion of the hole is desired and changing the electrical parameters and the repetition rate to cause heating of the laser rod and broadening of the laser beam in drilling the conical portion of the hole is also highly desired.

We believe that the parameters described above can readily be modified as needed by one skilled in the art to arrive at a hole having the geometry previously described using any one of the number of similar YAG laser drilling machines.

In production drilling of large numbers of holes in a workpiece it is beneficial, and preferred, to drill a multiplicity of conical hole portions and then to readjust the system parameters and drill the metering portions. This reduces the number of necessary system adjustments and leads to more stable system operation.

Those skilled in the art appreciate that laser drilled holes are readily distinguishable from EDM drilled holes. The laser drilling process is much more energetic than the EDM drilling process, laser drilling is accomplished in a matter of seconds (the actual laser interaction time is actually measured in milliseconds) while the EDM process takes many minutes. This means that the laser melted surface will show a much greater depth of resolidified (or recast) material than EDM processed material, and a greater depth of material which has been affected by heat (the heat affected zone) than does EDM processed material. Laser drilled hole surfaces also show solidified spattered particles of melted material. These differences make it easy to distinguish laser drilled holes from EDM drilled holes. We have some test results which suggest that the laser drilled conical sole roughness leads to improved cooling results compared to the smoother EDM drilled holes. The circular conical hole geometry is also beneficial (compared with the rectangular EDM hole geometry) in some applications where the flow direction of hot gases over the surface to be cooled is variable (and unpredictable). It is not commercially practical to produce circular-conical EDM holes because of the cost of producing circular-conical EDM electrodes.

A further distinction between laser drilled and EDM holes (with metering segments) is that the EDM metering segments will have diameters whose variation with length is so small as to be hard to measure (less than 0.0008 in.) while laser drilled holes will vary in diameter for about 0.001 to 0.005 over their length.

We are unaware that anyone has ever produced a hole of the invention geometry using laser drilling.

Although the invention has been described and illustrated with respect to exemplary embodiments thereof, it should be understood by those skilled in the art that the foregoing and various other changes, omissions and additions may be made without departing from the spirit and the scope of the invention.

What is claimed is:

1. A gas turbine engine component which includes at least one laser drilled hole having a conical portion with an apex, with an included apex angle of 8–20° and a constant cross section metering portion which intersects said cone in the region of said cone apex.

2. A gas turbine engine component as in claim 1 wherein said laser drilled hole has an apex angle of about 10° to about 16°.

3. A gas turbine engine component as in claim 1 wherein said hole has a metering portion with a cross sectional area equivalent to that of a circular hole having a diameter of about 0.010 in. to about 0.040 in.

4. A gas turbine engine component as in claim 1 wherein said conical portion of said hole and said metering portion of said hole are essentially coaxial.

5. A gas turbine engine component as in claim 1 wherein the metering section of said hole changes its diameter by from 0.001 to 0.005 in. over its length.

* * * * *